United States Patent [19]
Roth, Jr. et al.

[11] 3,927,245
[45] Dec. 16, 1975

[54] RESIN-COATED CARTON BLANK

[75] Inventors: Clarence Edward Roth, Jr., Orange; Robert L. Hughes, Houston, both of Tex.; Kenneth F. Thompson, Canton, N.C.

[73] Assignees: Gulf Oil Corporation, Pittsburgh, Pa.; by said Clarence Edward Roth and Robert L. Hughes; Champion International Corporation, New York, N.Y.; by said Kenneth F. Thompson

[22] Filed: July 5, 1974

[21] Appl. No.: 486,224

[52] U.S. Cl. ............... 428/513; 427/209; 427/211; 427/391; 427/411; 428/517
[51] Int. Cl.² .. B65D 5/56; C08F 29/12; D21H 1/36
[58] Field of Search ............... 117/68, 76 P, 155 UA, 117/161 UH; 427/209, 211, 391, 411; 428/513, 517

[56] References Cited
UNITED STATES PATENTS

| | | | |
|---|---|---|---|
| 3,561,994 | 2/1971 | Dwyre | 117/68 X |
| 3,595,943 | 7/1971 | Brunson et al. | 117/68 X |

*Primary Examiner*—Michael R. Lusignan

[57] ABSTRACT

Scored, resin-coated, fiber board blanks for liquid cartons are provided in which the fiber board core contains a first ethylene polymer coating directly bonded to the side of the blank that will form the interior of the ultimate carton, a second ethylene polymer coating is directly bonded to the side of the blank that will form the interior of the ultimate carton, a second ethylene polymer coating is directly bonded to the side of the blank that will form the exterior of the ultimate carton, and a third ethylene polymer coating is directly bonded to the second ethylene polymer coating. The first ethylene polymer coating is approximately 1 mil thick, the second ethylene polymer coating is about 0.5 mil thick, and the third ethylene polymer coating is about 0.05 mil thick. The ethylene polymer contained in the first and second ethylene polymer coatings is an ethylene polymer having a density of less than about 0.93 gram/cm³ and a melt point of less than about 108°C. The ethylene polymer contained in the third ethylene polymer coating will be an ethylene polymer having a density of about 0.96 gram/cm³. Each of the three ethylene polymer coatings will be free of any added slip agent.

A method for preparing such blanks is set forth in which the second ethylene polymer coating and the third ethylene polymer coating are simultaneously coated into the fiber board core by a coextrusion process.

4 Claims, 4 Drawing Figures

RESIN-COATED CARTON BLANK

BACKGROUND OF THE INVENTION

A widely used type of carton employed for packaging liquid food products, and particularly milk, is a fiber board carton bearing a coating of an ethylene polymer on both sides of the fiber board. The ethylene polymer on the interior surface of the carton is employed to provide a barrier coating between the package's contents and the fiber board. The coating on the exterior of the carton both for its aesthetic effect and for use in making a heat seal in the forming of the ultimate carton.

In the manufacture of such cartons, present commercial practice involves first preparing a scored carton blank. In this operation, an appropriate fiber board stock is coated on both sides with a low density ethylene polymer, typically an ethylene polymer having a density of less than about 0.93 gram/cm$^3$ and a melt point of less than about 108°C. Thereafter, the resin-coated fiber board is printed, scored for subsequent folding, and stamped to the dimensions required in the carton blanks. Customarily, but not mandatorily, overlapping flaps of the blank are heat sealed to form the side seal of the ultimate carton. Thereafter, the partially sealed cartons are shipped flat to the ultimate user.

At the dairy or other packaging plant, the side-sealed carton blanks are fed to specially designed automated equipment which opens the blanks and heat seals the bottoms thereof. The tops of the carton are left unsealed at this time.

The unfilled open-top cartons prepared as described above then are fed to the filling line where they are conveyed at high speed to a filling station. After the cartons are filled, they are moved to another station where overlapping flaps of the top of the carton are brought into touching relationship and heated to melt the touching resin surfaces and make the final seal of the carton.

Economic considerations dictate that dairy fill lines be operated at the highest possible rates of speed. The speed now attainable with the most modern filling lines is such that the drag factor between the resin-coated unfilled cartons and the metal surface of the filling line, usually polished stainless steel, limits the speed at which the filling line is operated. When such lines are operated at their maximum speed, a small but finite percentage of the unfilled cartons are not properly positioned under the fill station (by reason of late delivery resulting from the drag between the resin-coated carton and the metal surfaces of the fill lines) when the milk is discharged from the delivery tube. In these instances, the milk is wasted and this represents a substantial economic loss. In addition, the filling line must be stopped and the unfilled cartons must be removed from the fill line by hand. This interruption of the operation increases labor costs.

For the reasons described above, the art is seeking resin-coated cartons and blanks therefor which will have a lower coefficient of friction between the outer resin surface of the carton and the metal conveying surfaces of the filling line. Such lowered coefficient of friction must be attained, however, without detracting from the other requirements of the resin-coated cartons and the blanks therefor, particularly the ease and speed of heat sealing the touching surfaces of the carton blanks to fabricate the liquid cartons.

One proposal that has been made to reduce the coefficient of friction between the resin-coated carton and the metal surfaces of the fill line is to incorporate a slip agent, such as oleamide or erucamide, into the exterior resin coating of the carton. Such a modification will lower the coefficient of friction sufficiently to substantially eliminate the drag problem encountered in the fill line. Unfortunately, however, the incorporation of a slip agent in the resin coating creates other difficulties in that the coefficient of friction between the resin-coated blanks is reduced to the extent that the blanks readily slip over one another so that they cannot be handled in vertical stacks as is present commercial practice.

SUMMARY OF THE INVENTION

In accordance with this invention, modified, scored, resin-coated, fiber board blanks for liquid cartons are provided which have all the desired features of the presently employed carton blanks and, when converted into cartons, provide an exterior coating which has a reduced coefficient of friction with respect to polished stainless steel.

DETAILED DESCRIPTION OF THE INVENTION

The present invention is directed to a scored, resin-coated, fiber board for a liquid carton which bears three separate polymer coatings thereon. The carton blank consists of a fiber board core having a thickness in the range of about 15 to 30 mils, the precise thickness being dictated by the volumetric capacity of the carton to be prepared therefrom. The carton blank bears on the surface designed to be the interior of the ultimate carton a first ethylene polymer coating, such coating being about 0.5 to 1.2 mils thick. The carton blank bears directly on the surface designed to be the exterior of the ultimate carton a second ethylene polymer coating, such coating being about 0.2 to 0.5 mil thick. The carton blank bears a third polymer coating directly bonded to said second ethylene polymer coating, said third polymer coating being less than about 0.1 mil thick. The third polymer coating will be a coating of an olefin polymer of the type described in the paragraph below. Each of the polymer coatings is free of any added slip agent.

The ethylene polymer contained in the first and second ethylene polymer coatings is an ethylene polymer having a density less than about 0.93 gram/cm$^3$. The ethylene polymer also will have a melt point of less than about 108°C. The ethylene polymers contained in the first and second ethylene polymer coatings may be different ethylene polymers so long as they both meet the specifications previously set forth, but normally the identical ethylene polymer will be contained in both of the first and second ethylene polymer coatings. The olefin polymer contained in the third polymer coating will be either an ethylene polymer having a density of at least about 0.96 gram/cm$^3$ or a highly crystalline propylene polymer which has a maximum solubility of about 5% in boiling heptane.

The ethylene polymer included in the first and second ethylene polymer coatings will be an ethylene polymer having a density and melt point within the range previously described. Such ethylene polymers are commercially available and can be prepared by continuous high pressure mass polymerization processes. Such ethylene polymers may contain anti-oxidants and stabilizers to protect the ethylene polymer from oxidation and crosslinking. Any additives employed for this purpose must be of a type approved for use in ethylene polymers used in food packaging. 2,6-ditertiarybutyl-4-methylphenol is the anti-oxidant customarily employed for this purpose.

The olefin polymer contained in the third polymer coating will be either an ethylene polymer having a density within the range previously described or a highly crystalline propylene polymer having a heptane solubility within the range previously described. Such olefin polymers are commercially available and can be prepared by well-known methods such as the so-called Phillips process and the Ziegler process. Appropriate additives such as anti-oxidants and the like can be included in such resins.

Figure 1:
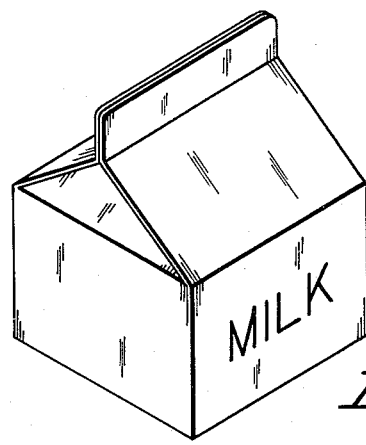
FIG. 1 is a prospective view of a typical resin-coated milk carton.
Figure 2:
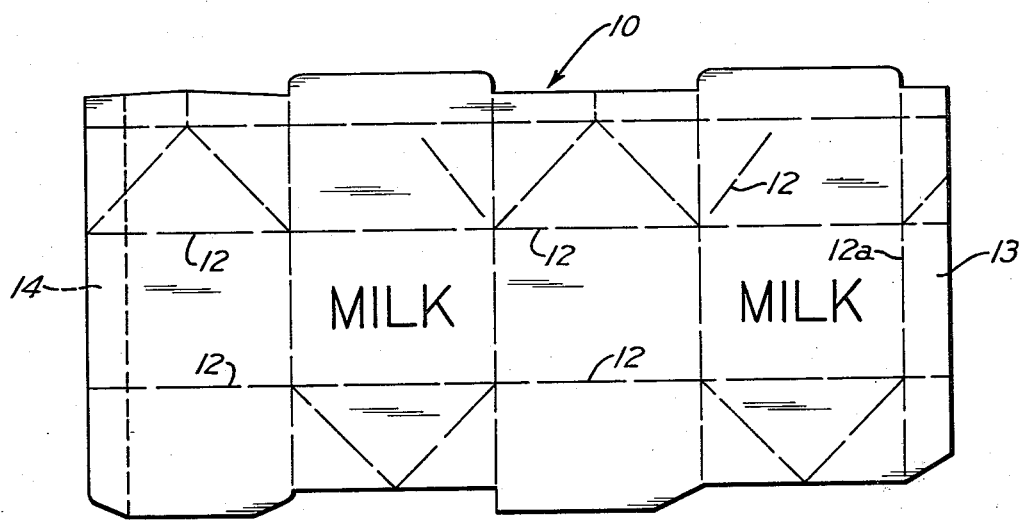
FIG. 2 is a view of the carton blank from which the carton of FIG. 1 is prepared.

With reference to the drawings, FIG. 1 is a perspective view of a milk carton assembled and prepared from a carton blank made in accord with the present invention. FIG. 2 is a drawing of the specific form of carton blank employed to manufacture the carton shown in FIG. 1. The blank shown in FIG. 2 constitutes a flat, resin-coated, fiber board 10 that has been cut to the appropriate dimensions and contains impressed score lines 12 which readily yield under pressure to form the carton. The score line 12a defines a flap 13 which, when assembled, overlaps the underside of area of the blank designated by the number 14. The overlapping areas 13–14 are ultimately heat sealed to form the side seal of the carton. Such carton blanks — other than the specific coatings borne thereon — are standard items of commerce and for this reason are not described in further detail.

Figure 3:
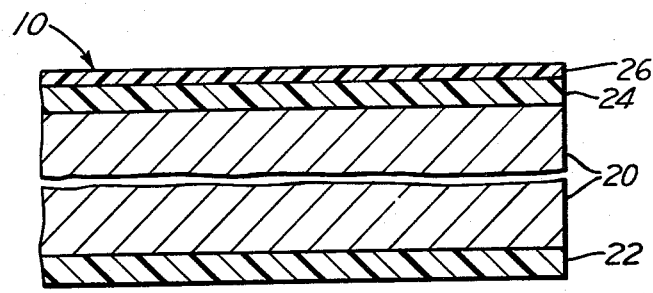
FIG. 3 is a cross-sectional view of a resin-coated blank of the present invention.

FIG. 3 is a cross-sectional view of a carton blank made in conformity with the present invention. The overall blank 10 consists of a center core 20 which is fabricated from fiber board conventionally employed in the manufacture of milk cartons. The core 20 will have an appropriate thickness such as about 15 mils for a half pint milk carton. The first ethylene polymer coating on the carbon blank is depicted as 22 and is on the surface of the blank which ultimately will constitute the interior of the carton. For use in the manufacture of a half pint milk container, coating 22 will be approximately 1 mil thick. The second ethylene polymer coating is depicted as 24. In a blank for a half pint milk carton, coating 24 will be about 0.5 mil thick. The third olefin polymer coating is depicted as 26. In a blank for a half pint milk carton, coating 26 will be about 0.05 mil thick.

Figure 4:
FIG. 4 is a view of a stack of carton blanks in which the top members of the stack have slid partially out of the stack by reason of an undesirably low coefficient of friction between touching surfaces of the blanks.

FIG. 4 illustrates a plurality of carton blanks 10 in vertical stacked relationship. The two topmost blanks 10a and 10b are illustrated as having moved horizontally out of the desired stack as a result of an undesirably low coefficient of friction between the touching surfaces of the carbon blanks. Such a shifting can occur when a slip agent is incorporated into either or both of the exterior resin coatings of the carton blank.

The resin-coated fiber board blanks of the invention can be manufactured by techniques similar to those employed in preparing corresponding prior art structures in which a single coating of resin is laid down on both faces of the fiber board blank. In the manufacture of the blanks of the invention, the first ethylene polymer coating will be laid down on one surface of an appropriate fiber board by an extrusion coating process. In a preferred embodiment of the invention, the second ethylene polymer coating and the olefin polymer coating will be laid down simultaneously on the opposite side of the fiber board by an extrusion coating process in which the two resins are fed to and through the extrusion die in a flat planar relationship such that the ethylene polymer contacts the fiber board and the olefin polymer constitutes the top surface of the coated article.

Methods for simultaneously extruding two resins through a single die opening to form a composite layered structure are known in the art and are generally referred to as coextrusion processes. The two resins are fed from two extruders into a single die. The die may have two chambers whose outlets merge immediately upstream from the die orifice. Alternatively, and preferably, a single chamber die is employed with the two resins being simultaneously fed into a feed line upstream from the die chamber. Usually an adapter or flow divider is included in the line with one resin being fed into the line upstream of the adapter with the second resin being fed into the line at the adapter. The adapter divides the feed line into two separate and divided chambers. Accordingly, the two resins do not meet until after they have flowed past the adapter. The adapter is so constructed that as the resins pass its downstream end they are flowing in a fixed pattern and do not intermix, but rather continue flowing downstream in separate, but touching, streams.

The method employed on the present invention for simultaneously laying down on the fiber board core both the second ethylene polymer coating and the olefin polymer coating will be essentially similar to the coextrusion techniques generally employed in the art and described above. Special care will be observed, however, to feed the two resins through the extrusion die and associated feeding lines under conditions such that the two resins are extruded through the die in a flat planar relationship. The two resins will be fed to the apparatus in amounts such that the olefin polymer resin will constitute about 1–12% of the combined weight of the two resins. Both resins will be fed to the extrusion die at temperatures such that their flow characteristics through the die will be substantially the same. By carrying out the extrusion of the two resins under these conditions, the dual coatings laid down on the fiber board core will closely approximate the idealized layered construction illustrated in FIG. 3.

As will be demonstrated in the examples which follow, the coefficient of friction between the olefin polymer coating of the carton blanks of the invention and polished stainless steel is affected by the thickness of the olefin polymer coating. By reason of this fact, the olefin polymer coating must have a finite thickness which will be at least 1% of the thickness of the second ethylene polymer coating, but the thickness will not exceed 12% of the thickness of the second ethylene polymer coating. Under any circumstances, the olefin polymer coating will not exceed more than about 0.1 mil. The minimum thickness employed in the olefin polymer coating will be dictated by the coefficient of friction desired between the olefin polymer surface of the coated carton blank and polished stainless steel. The maximum thickness of the olefin polymer coating will be held within the limits previously set forth so that the interior and exterior surfaces of the carton blanks can be readily heat sealed employing equipment and conditions presently employed in the art.

The coefficient of friction values between the olefin polymer coating of the carton blanks of the invention and polished stainless steel can be measured by techniques presently known and employed by the art. As is recognized in the art, the precise numerical values obtained are affected, at least to a minor degree, by both the surface polish of the stainless steel plate employed in the test and the frequency with which the surface of the stainless steel plate is cleaned between test measurements. When employing a highly polished stainless steel surface that is rigorously cleaned before employment by washing with alcohol, a coefficient of friction value of approximately 0.5 is obtained when the exterior surface of the coated carton blank is a low density ethylene homopolymer having a density of about 0.93 gram/cm$^3$. By contrast, a coefficient of friction value of about 0.2 is obtained when the exterior surface of the coated carbon blank consists solely of an olefin polymer of the type described above. The coefficient of friction values of the carton blanks of the invention, when measured between the olefin polymer surface and a polished stainless steel plate, will lie intermediate between 0.2 and 0.5, depending principally upon the thickness of the olefin polymer coating.

The following examples are set forth to illustrate the principle and practice of the invention.

EXAMPLE 1

A series of runs were made to illustrate the effect that the relative thickness of the second ethylene polymer coating and the olefin polymer coating will have upon the coefficient of friction between the olefin polymer coating and a polished stainless steel surface. A first ethylene polymer coating approximately 1 mil thick was laid down upon a 40 lb. kraft paper substrate employing a laboratory extrusion coater fed by a 4½ inch extruder. The resin coated onto the paper had a density of 0.924 gram/cm$^3$, a melt point of 108°C., and a melt index of 3.5.

The other side of the resin-coated paper described above was coated with the same extrusion coater to lay down a coating about 0.5 mil thick. An adapter was inserted into the polymer feed line upstream of the die. A 4½ inch extruder was employed to feed the same ethylene polymer described above through the main channel of the feed line. A 1½ inch die was employed to feed an ethylene polymer having a density of 0.963 gram/cm$^3$, a melt point of 127°C., and a melt index of 30 through the second channel of the feed line. The feed rates of the two resins were adjusted so that the high density ethylene polymer constituted, respectively, 1.5, 2, 4, 6, 8 and 10% of the two resins being extruded.

Coefficient of friction values were measured between the olefin polymer surface (i.e. the surface containing the ethylene polymer having a density of 0.963 gram/cm$^3$) and a polished stainless steel plate. The coefficient of friction values were determined by ASTM D-1894-61T (Procedure A). The results are set forth in Table I.

Table I

| Thickness of Olefin Polymer Coating; % of the Total Thickness of the Two Ethylene Polymer Coatings | Coefficient of Friction |
| --- | --- |
| 0 (Control) | 0.45 |
| 1.5 | 0.40 |
| 2.0 | 0.36 |
| 4.0 | 0.34 |
| 6.0 | 0.30 |
| 8.0 | 0.26 |
| 10.0 | 0.23 |

On first consideration, it would appear to be surprising to note the change in the coefficient of friction values with the thickness of the olefin polymer coating. It would seem that the measured coefficient of friction values should be influenced solely by the touching surfaces and therefore should be (within experimental error) independent of the thickness of the olefin polymer surface.

While the applicants do not wish to be bound by any theory respecting the operability of their invention, it is believed that the depiction of the cross-sectional area of the coated resin blank of the invention, as illustrated in FIG. 3, may represent an idealized construction which is not always obtained in actual practice. It is quite possible that the thickness of the olefin polymer coating is not completely uniform over the entire area of the coated surface. In particular, when the olefin polymer coating is extremely thin, there may be areas in the overall surface where the polymer present in the second ethylene polymer coating bleeds through to the top surface of the coated blank and may contact the polished stainless steel surface in the tests being carried out. As the thickness of the olefin polymer coating is increased, the likelihood of such bleed-through is reduced, and if bleed-through areas exist, they constitute a smaller percentage of the total exposed surface of the coated blank.

EXAMPLE 2

A comparison run was made in a commercial dairy in which two lots of resin-coated carton blanks were employed to manufacture half pint milk cartons on commercial equipment, which cartons then were filled on a commercial milk fill line. Carton blanks made in accord with the invention were employed in which the fiber board core was about 15 mils thick, the first ethylene polymer coating was about 1 mil thick, the second ethylene polymer coating was about 0.45 mil thick and the third ethylene polymer coating was about 0.05 mil thick. The ethylene polymer included in the first and second ethylene polymer coatings was the 0.924 gram/cm$^3$ density resin described in Example 1. The olefin polymer resin included in the olefin polymer coating was the 0.963 gram/cm$^3$ density ethylene polymer resin described in Example 1. As a prior art control, an identical blank was employed, except that in lieu of the second and third ethylene polymer coatings, the exterior surface of the blank bore a coating about 0.5 mil thick with the resin contained therein being identical in composition to the resin contained on the opposite surface of the blank.

A run of approximately 4 hours duration was made with cartons prepared from the carton blanks of the invention. No difficulties were encountered in heat sealing the cartons. Throughout the run, all of the cartons were conveyed through the fill line so as to reach the fill station at the appropriate times with no milk losses being incurred.

In an identical run employing cartons prepared from the prior art carton blanks, periodically the cartons did not reach the fill station in time to be properly filled by reason of frictional drag with the stainless steel of the fill line. Accordingly, an economic loss was incurred with the cartons prepared from the prior art blanks.

While the invention has been described with respect to a carton blank for a milk carton, it is apparent that the invention can be used to manufacture carton blanks for other types of cartons such as those used to package frozen foods and the like. Similarly, the methods described herein can be used to lightly overcoat any type of substrate coated with a low density ethylene polymer (density of less than 0.93 gram/cm$^3$), where it is desired to lower the coefficient of friction between said low density ethylene polymer surface and a second surface.

What is claimed is:

1. A scored, resin-coated, fiber board blank for a liquid carton, consisting essentially of:
    1. a fiber board core having a thickness of about 15 to 30 mils,
    2. a first ethylene polymer coating directly bonded to the side of the blank that will form the interior of the ultimate carton, said coating being about 0.5 to 1.2 mils thick,
    3. a second ethylene polymer coating directly bonded to the side of the blank that will form the exterior of the ultimate carton, said coating being about 0.2 to 0.5 mil thick, and
    4. an olefin polymer coating directly bonded to said second ethylene polymer coating, said olefin polymer coating being less than about 0.1 mil thick;

the ethylene polymer contained in said first and second ethylene polymer coatings being an ethylene polymer having a density of less than about 0.93 gram/cm$^3$ and a melt point of less than about 108°C., the olefin polymer contained in said olefin polymer coating being either an ethylene polymer having a density of at least about 0.96 gram/cm$^3$ or a highly crystalline propylene polymer which has a solubility of less than 5% in boiling heptane; each of the three polymer coatings being free of any added slip agent; the coefficient of friction between the olefin polymer coated surface of the blank and polished stainless steel being from about 0.2 to about 0.4.

2. A scored, resin-coated, fiber board blank for a liquid carton, consisting essentially of:
    1. a fiber board core having a thickness of about 15 to 30 mils,
    2. a first ethylene polymer coating directly bonded to the side of the blank that will form the interior of the ultimate carton, said coating being about 1 mil thick,
    3. a second ethylene polymer coating directly bonded to the side of the blank that will form the exterior of the ultimate carton, said coating being about 0.5 mil thick, and
    4. an olefin polymer coating directly bonded to the second ethylene polymer coating, said third coating being about 0.05 mil thick;

the ethylene polymer contained in said first and second ethylene polymer coatings being an ethylene polymer having a density of less than about 0.93 gram/cm$^3$ and a melt point of less than about 108°C.; the olefin polymer contained in said olefin polymer coating being an ethylene polymer having a density of about 0.96 gram/cm$^3$; each of the three ethylene polymer coatings being free of any added slip agent; the coefficient of friction between the olefin polymer coated surface of the blank and polished stainless steel being about 0.3.

3. In a method for preparing a coated cellulosic substrate sheet by extrusion coating onto said cellulosic substrate sheet an ethylene polymer having a density of less than about 0.93 grams/cm$^3$ and coating onto said polymer a second polymer of a density different than the first; the improvement which comprises reducing the coefficient of friction of said ethylene polymer coated surface of said coated article to stainless steel by feeding a mixture of said two polymers to the extrusion die, the first of said polymers being an ethylene polymer having a density of less than 0.93 grams/cm$^3$, the second of said polymers being either an ethylene polymer having a density of at least about 0.96 grams/cm$^3$ or a highly crystalline propylene polymer which has a solubility of less than 5% in boiling heptane, both of said polymers being free of any added slip agent, the two polymers being fed to the extrusion die in amounts such that the second polymer constitutes about 1–12% of the combined weight of the two polymers, and the two polymers being fed to and through the extrusion die in a flat planar relationship such that the first polymer is bonded directly to the cellulosic substrate and the second polymer constitutes the exterior surface of the coated article.

4. The method of claim 3 in which the second resin is an ethylene polymer having a density of at least about 0.96 grams/cm$^3$.

* * * * *